(12) United States Patent
Carthew et al.

(10) Patent No.: US 10,913,532 B2
(45) Date of Patent: Feb. 9, 2021

(54) PRECISION LANDING SYSTEM FOR UNMANNED AERIAL VEHICLES AND UTILIZATION THEREOF

(71) Applicant: Ford Global Technologies, LLC, Dearborn, MI (US)

(72) Inventors: James Carthew, Oakland, CA (US); Aditya Singh, Redwood City, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 16/109,495

(22) Filed: Aug. 22, 2018

(65) Prior Publication Data
US 2020/0062389 A1  Feb. 27, 2020

(51) Int. Cl.
| | | |
|---|---|---|
| B64C 39/02 | (2006.01) | |
| B64D 1/22 | (2006.01) | |
| G01S 1/70 | (2006.01) | |
| G05D 1/00 | (2006.01) | |
| G05D 1/06 | (2006.01) | |
| G05D 1/10 | (2006.01) | |
| G05D 1/12 | (2006.01) | |

(52) U.S. Cl.
CPC ............. *B64C 39/024* (2013.01); *G01S 1/70* (2013.01); *G05D 1/0022* (2013.01); *G05D 1/0094* (2013.01); *G05D 1/101* (2013.01); *G05D 1/12* (2013.01); *B64C 2201/145* (2013.01); *B64C 2201/146* (2013.01)

(58) Field of Classification Search
CPC ............ B64C 39/024; B64C 2201/145; B64C 2201/146; G05D 1/12; G05D 1/0022; G05D 1/101; G05D 1/0094; G01S 1/70

USPC .......................................................... 701/517
See application file for complete search history.

(56) References Cited

U.S. PATENT DOCUMENTS

| | | | |
|---|---|---|---|
| 9,244,147 B1 * | 1/2016 | Soundararajan | G01C 21/00 |
| 9,592,908 B2 | 3/2017 | Gentry | |
| 2015/0301150 A1 * | 10/2015 | Stuckman | G06T 19/006 342/407 |
| 2017/0261975 A1 * | 9/2017 | Liu | H04B 10/116 |
| 2017/0372259 A1 * | 12/2017 | Lesser | B64D 1/08 |
| 2018/0006894 A1 * | 1/2018 | Power | H04L 41/12 |
| 2018/0265222 A1 * | 9/2018 | Takagi | B64C 27/08 |

(Continued)

FOREIGN PATENT DOCUMENTS

| | | |
|---|---|---|
| CN | 206318030 U | 7/2017 |
| CN | 107168373 A | 9/2017 |

(Continued)

OTHER PUBLICATIONS

Nguyen, et al., "Remote Marker-Based Tracking for UAV Landing Using Visible-Light Camera Sensor," Sensors, 2017, 17(9): 1-38.

Primary Examiner — Behrang Badii
Assistant Examiner — Hossam M Abd El Latif
(74) *Attorney, Agent, or Firm* — Brandon Hicks; Eversheds Sutherland (US) LLP (57) ABSTRACT

A precision landing system including an unmanned aerial vehicle (UAV) and a beacon is provided. A processor of the UAV controls a flight system of the UAV to fly the UAV. The processor detects, via a sensor of the UAV, a signal emitted by a beacon. The processor controls the flight system of the UAV to land on or near the beacon. The processor also energizes one or more electromagnets on a cradle of the UAV to retrieve the beacon.

19 Claims, 6 Drawing Sheets

(56) References Cited

U.S. PATENT DOCUMENTS

2019/0034877 A1\* 1/2019 Cantrell ........... G06Q 10/08355
2020/0046156 A1\* 2/2020 Holzer ...................... B64F 1/32
2020/0141558 A1\* 5/2020 Leeuwangh ............ F21S 8/024
2020/0234600 A1\* 7/2020 Priest .................... B64C 39/024

FOREIGN PATENT DOCUMENTS

WO 2016/201359 A1 12/2016
WO 2017/029611 A1 2/2017

\* cited by examiner

```
┌─────────────────────────────────────────────┐
│ Control, by a processor of an unmanned      │
│ aerial vehicle (UAV), a flight system of    │
│ the UAV to fly the UAV                      │
│ 410                                         │
└─────────────────────────────────────────────┘
                     │
                     ▼
┌─────────────────────────────────────────────┐
│ Detect, by the processor via a sensor of    │
│ the UAV, light emitted by a beacon          │
│ 420                                         │
└─────────────────────────────────────────────┘
                     │
                     ▼
┌─────────────────────────────────────────────┐
│ Control, by the processor, the flight       │
│ system of the UAV to land on or near the    │
│ beacon                                      │
│ 430                                         │
└─────────────────────────────────────────────┘
                     │
                     ▼
┌─────────────────────────────────────────────┐
│ Energize, by the processor, one or more     │
│ electromagnets on a cradle of the UAV to    │
│ retrieve the beacon                         │
│ 440                                         │
└─────────────────────────────────────────────┘
```

PRECISION LANDING SYSTEM FOR UNMANNED AERIAL VEHICLES AND UTILIZATION THEREOF

TECHNICAL FIELD

The present disclosure generally relates to unmanned aerial vehicles (UAVs) and, more particularly, to a precision landing beacon for UAVs as well as deployment and retrieval thereof.

BACKGROUND

Active positioning beacons (APBs) are devices that provide a means for landing UAVs with greater accuracy purely based on Global Positioning System (GPS) data. For high-precision landing operations, a combination of APBs and GPS can be utilized. Typically, APBs are used in courier UAV applications where an area surrounding a landing zone is constrained. For example, it is important that the UAV places a package on the front step of a building and not on the roof directly above the front step. As another example, in an emergency, precision landing could mean a difference between delivering supplies to an isolated area or losing the UAV and supplies in floodwaters.

APBs operated by transmitting a signal using a light source, usually at a specific frequency of infrared (IR), can be recognized by a camera or IR sensor mounted on a UAV. The position of the signal within a video frame, or an intensity of the signal as measured by the IR sensor or an IR sensor array, in conjunction with a known position of the camera or sensor/sensor array on the UAV, can be utilized to indicate the position of the UAV and achieve a very precise landing of the UAV. An APB deployed in an isolated area should be self-contained, and the beacon should operate for a long period of time using a battery in certain scenarios. Without human intervention to retrieve the beacon, it can be considered lost.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, which illustrate specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Under various designs, schemes, concepts, systems and methods in accordance with the present disclosure, a precision landing system may include a UAV and a precision landing beacon deployable by the UAV in various scenarios, including those in which precise landing is important but supporting infrastructure is limited (e.g., during natural disasters and/or in emergency areas). Human operators on the ground may be able to quickly define a safe landing area for the UAV in a given vicinity, and this may be especially helpful during natural disasters as well as in emergency situations. The UAV may mark a geographic location with a precision landing beacon that can be located in real-time or at a later time/date. The present disclosure also provides an automated method to deploy one or more geographic markers for prospecting and surveying industries. Moreover, under various implementations of the present disclosure, the UAV may be landed on a moving vehicle, such as a car, a plane, etc., or another UAV.

Figure 1:
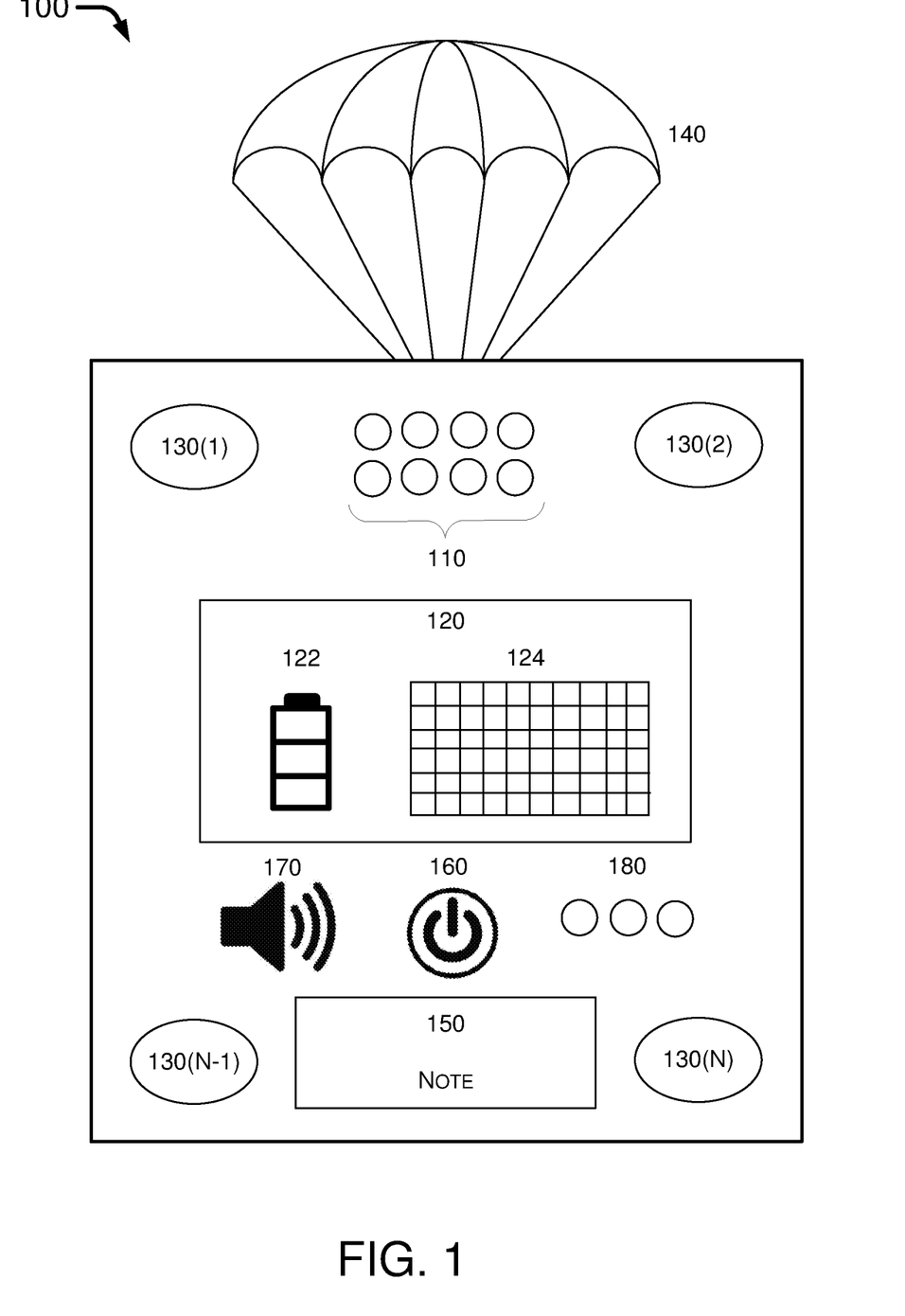
FIG. 1 is a diagram of an example UAV-deployable precision landing beacon in accordance with an embodiment of the present disclosure.

FIG. 1 illustrates an example UAV-deployable precision landing beacon 100 in accordance with an embodiment of the present disclosure. Referring to FIG. 1, the precision landing beacon 100 may include a light source array 110 having an array of light sources that emit IR light and/or visible light. The light source array 110 may provide a reference point to a UAV-mounted precision landing sensor (e.g., an IR camera or a photodiode array) for landing operations. In some embodiments, the light source array 110 may be capable of emitting IR light. Alternatively, the light source array 110 may be capable of emitting visible light. Still alternatively, the light source array 110 may be capable of emitting both IR light and visible light. The light source array 110 may emit any suitable signal or combinations thereof.

The precision landing beacon 100 may also include a power circuit 120 and a set of one or more metal components or magnets 130(1)~130(N), with N being a positive integer equal to or greater than 1. The power circuit 120 may include a battery 122. The power circuit 120 may also include a solar array (or solar panel) 124 capable of harnessing solar energy to provide electrical energy for other components of the precision landing beacon 100. Thus, the solar array 124 may allow long-term deployment and operation of the precision landing beacon 100. The one or more metal components or magnets 130(1)~130(N) may allow a landing UAV to collect or otherwise retrieve the precision landing beacon 100 prior to take-off. For example, the UAV may be equipped with a beacon cradle including a number of electromagnets that can be turned on and off. The beacon cradle may be situated on a bottom side of the UAV near an end of a landing support structure of the UAV. Thus, prior to take-off, the electromagnets of the beacon cradle may be activated, turned on or otherwise energized, so that the precision landing beacon 100 may be retrieved by the UAV due to attraction between the energized electromagnets of the beacon cradle on the UAV and the one or more metal components or magnets 130(1)~130(N) on the precision landing beacon 100. In some embodiments, the beacon cradle of a UAV may be configured to carry multiple precision landing beacons such that the UAV may be used to deploy and retrieve multiple precision landing beacons. The precision landing beacons may be deployed together or at different times.

Optionally, the precision landing beacon 100 may also include a parachute 140, a note 150, a button 160, a buzzer 170, and/or a light-emitting diode (LED) array 180. The parachute 140 may be brightly colored (e.g., in red and white and/or other colors) to aid in spotting the precision landing beacon 100 from a distance, whether by naked eyes or via a camera. The parachute 140 may have a size of 300 mm×300 mm, for example and without limitation, and may be capable of creating a drag or aerodynamic lift to slow a downward fall of the precision landing beacon 100 due to gravity. The note 150 may be a small plaque or plate with operational instructions in one or more languages. That is, the note 150 may be used to provide textual instructions in various languages on how to operate the precision landing beacon 100. For example, verbiage indicated by the note 150 may include: "Place this beacon in a safe area for UAV landing. Press the power button and move 10 feet away from the beacon. Ensure this text is facing up." The note 150 may include any suitable instructions or indicia. The button 160 may be used by a user to activate, turn on or otherwise energize the buzzer 170 and/or the LED array 180. In some embodiments, the buzzer 170 may be a piezo-electric buzzer and, when energized, may emit a loud sound as an indication of the presence and location of the precision landing beacon 100. In some embodiments, the LED array 180 may emit bright and/or flashing light as an indication of the presence and location of the precision landing beacon 100. Accordingly, the parachute 140, the buzzer 170, and/or the LED array 180 may assist users on the ground in locating the precision landing beacon 100. It is noteworthy that, for applications such as geographic marking for the prospecting and surveying industries, certain features of the precision landing beacon 100 (e.g., the button 160, the buzzer 170, and/or the note 150) may be unnecessary. That is, these features may be omitted.

In some embodiments, except for the parachute 140, one or more of the above-described features of the precision landing beacon 100 may be duplicated and provided on two primary sides of the precision landing beacon 100 that are opposite to each other. That is, the precision landing beacon 100 may be double-sided in terms of one or more above-described features. For instance, at least the light source array 110 may be provided on two opposing sides of the precision landing beacon 100. Accordingly, for autonomous operations (e.g., during natural disasters and/or in emergency situations), IR light and/or visible light emitted by the light source array 110 may still be visible from above (e.g., by a UAV) regardless of the orientation of the precision landing beacon 100 upon landing. In some embodiments, the precision landing beacon 100 may further include a protective cage (not shown) that at least partially surrounds the precision landing beacon 100 to protect one or more components of the precision landing beacon 100 (e.g., the solar array 124) from damage due to falling from above after being released by a UAV.

The precision landing beacon 100 may be carried by a UAV in flight and prior to deployment. This may be achieved by using the beacon cradle on the UAV such that the one or more metal components or magnets 130(1)~130(N) on the precision landing beacon 100 may be held in place by the electromagnets of the beacon cradle of the UAV. In some instances, the UAV may deploy the precision landing beacon 100 by disabling the electromagnets. Accordingly, the precision landing beacon 100 may fall to the ground from the UAV due to gravity.

Deployment of the precision landing beacon 100 may be remotely triggered by a human operator observing a video feed or autonomously through gesture recognition. That is, the UAV may be operated by a human operator or, alternatively, autonomously deployed. The precision landing system including the UAV and the precision landing beacon 100 may be most suited to scenarios in which the UAV is autonomously operated or when the human operator is beyond the line of sight of the UAV. UAVs deployed autonomously in an emergency situation may be geo-locked to a certain search area (e.g., as defined or otherwise identified by the human operator), such that the UAV will not deploy one or more of its associated precision landing beacons or react to any other precision landing beacon outside the search area.

Figure 2A:
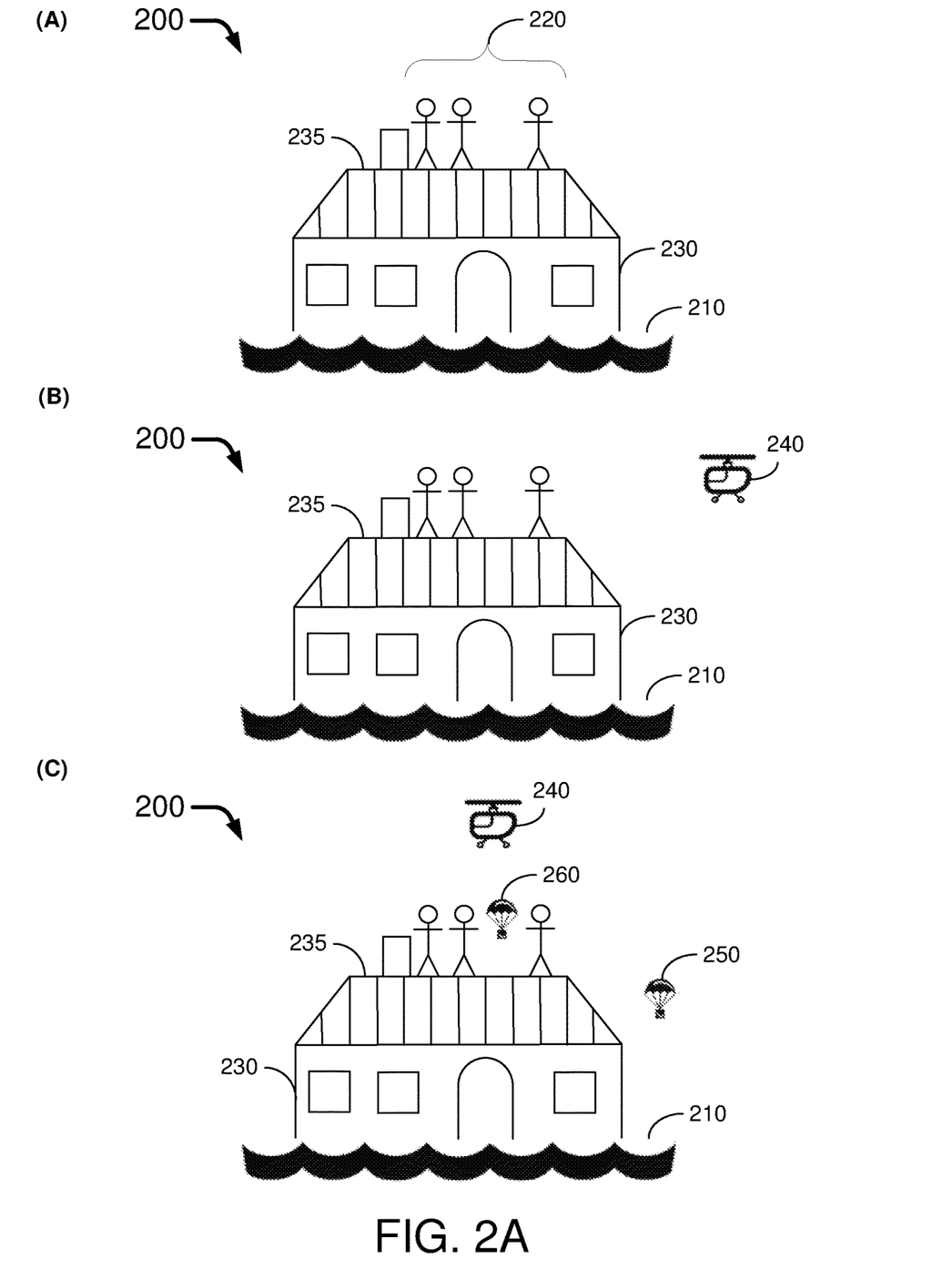
FIG. 2A and FIG. 2B each provide diagrams pertaining to an example scenario in which a UAV-deployable precision landing beacon may be utilized in accordance with an embodiment of the present disclosure.
Figure 2B:
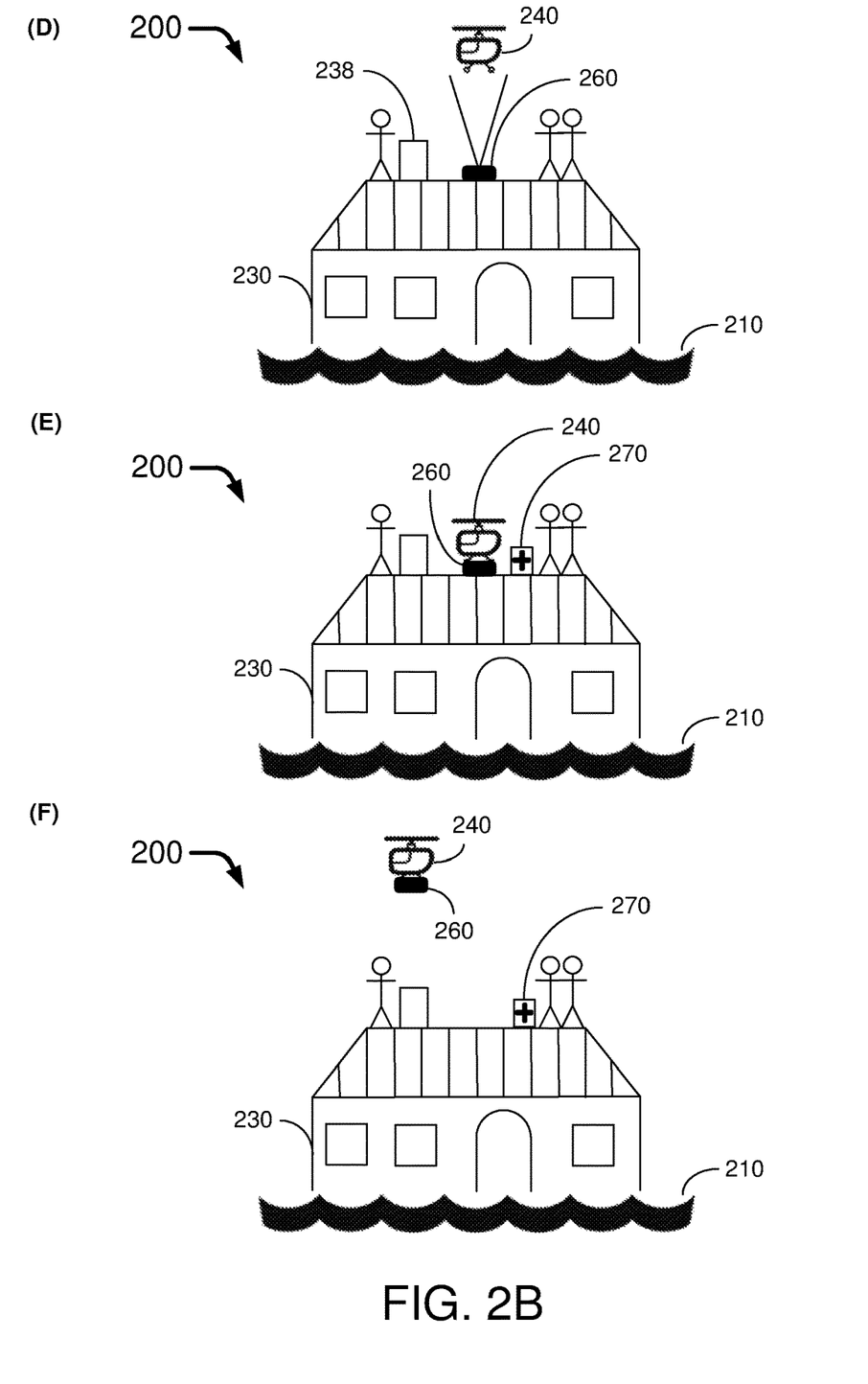

FIG. 2A and FIG. 2B each illustrates portions of an example scenario 200 in which a UAV-deployable precision landing beacon 100 may be utilized in accordance with an embodiment of the present disclosure. It is noteworthy that the scenario 200 is provided for illustrative purposes and thus in no way limits the scope of the present disclosure. That is, utilization of the precision landing system in accordance with the present disclosure is not limited to the scenario 200.

Referring to part (A) of FIG. 2A, flood waters 210 have resulted in an isolated population in need of urgent medical supplies. For example, a number of people 220 may be trapped on the roof 235 of a building 230. Referring to part (B) of FIG. 2A, a UAV 240 of the precision landing system is deployed to provide assistance to the isolated population. Landing of the UAV 240 is complicated by the surrounding waters 210 and the geometry of the roof 235. It may be difficult for a human operator or the UAV 240 to define or identify a safe landing zone. Referring to part (C) of FIG. 2A, the UAV 240 may first deploy a first precision landing beacon 250 (e.g., the precision landing beacon 100). In some instances, the first precision landing beacon 250 may land in an inaccessible area (e.g., in the waters). The UAV 240 then deploys a second precision landing beacon 260 (e.g., the precision landing beacon 100), which lands on the roof 235 and is thus accessible and retrievable by the people 220 on the roof 235. Referring to part (D) of FIG. 2B, one person reads the instructions on the second precision landing beacon 260 (e.g., the text and/or pictures of the note 150) to learn how to operate it. For example, the person may place the second precision landing beacon 260 on a flat portion of the roof 235, away from the chimney 238 and the surrounding waters 210 and may activate the second precision landing beacon 260. The second precision landing beacon 260 indicates to the UAV 240 that the UAV 240 should begin landing procedures. The second precision landing beacon 260 also provides a target for the UAV 240 on which the UAV 240 is to land. Referring to part (E) of FIG. 2B, the UAV 240 lands on the roof 235 (e.g., on top of the second precision landing beacon 260) and safely dispenses the medical supplies 270. Referring to part (F) of FIG. 2B, the UAV 240 takes off in flight with the second precision landing beacon 260 attached to the UAV 240. The first precision landing beacon 250 is lost in this mission. However, in an emergency situation, the loss of a precision landing beacon is a minor loss compared to the potential loss of the UAV and the payload (e.g., medical supplies).

Thus, once deployed, the precision landing beacon 100 may be retrieved by a ground user (e.g., an individual needing assistance after a natural disaster or emergency situation, or a person aiding the situation), and the note 150 may inform the ground user on the usage and operation of the precision landing beacon 100. Once the precision landing beacon 100 is positioned by the ground user in a desired location and orientation with the button 160 pressed, the ground user may move and stay away from the precision landing beacon 100. The UAV may loiter for a predefined amount of time near the precision landing beacon 100 before moving on if the precision landing beacon 100 is not activated. If the precision landing beacon 100 is activated (e.g., with the light source array 110 emitting IR and/or visible light), the UAV may perform landing operations. The ground user may indicate to the UAV that the UAV can take off with the precision landing beacon 100 retrieved by pressing a take-off indication button on the precision landing beacon 100 (not shown). The UAV may store a digital record of visited locations and interactions which may be backed up to a remote server once a wireless communication with a mobile or Wi-Fi network is established.

Prior to take-off, the UAV may modulate or otherwise activate the electromagnets in the beacon cradle to collect or otherwise retrieve the precision landing beacon 100. Since the precision landing beacon 100 was utilized by the UAV to perform landing operations, the UAV may be on top of the precision landing beacon 100 that is being retrieved. The beacon cradle may be situated underneath the UAV and towards an extremity of the landing structure of the UAV to allow the precision landing beacon 100 to be collected. The UAV may then continue its flight path until another landing opportunity is encountered.

The precision landing system in accordance with the present disclosure may be implemented in a conventional way in which a continuous IR source is projected for a camera on the UAV to detect. Alternatively, a visible light or IR signal may be modulated to transmit an identification or serial number of a specific precision landing beacon for mapping purposes or as a method to communicate requirements in an emergency setting. In some embodiments, a number of switches (not shown) may be provided on the precision landing beacon 100 to allow a ground user to indicate to a UAV, a plane or a helicopter flying by whether food, water, and/or medical assistance is required. That is, the precision landing beacon 100 may transmit a signal corresponding to the setting of the switches (e.g., by modulating IR light and/or visible light emitted by the light source array 110). Each setting of the switches may correspond to a specific code of a plurality of predefined codes or messages that may be registered or otherwise recognizable by the UAV, along with the location of the precision landing beacon 100 emitting such signal. For example, when three on-off switches are provided on the precision landing beacon 100, there may be eight possible settings of the three switches including: off-off-off (0-0-0), off-off-on (0-0-1), off-on-off (0-1-0), off-on-on (0-1-1), on-off-off (1-0-0), on-off-on (1-0-1), on-on-off (1-1-0), and on-on-on (1-1-1). Thus, in this example, each of the eight settings may correspond to eight predefined codes or messages. Alternatively, a notebook or notepad and a pen or pencil carried by the UAV may provide an ad-hoc mail carrier for a ground user in a non-networked area to convey a message to a rescue team that deploys the UAV.

Figure 3:
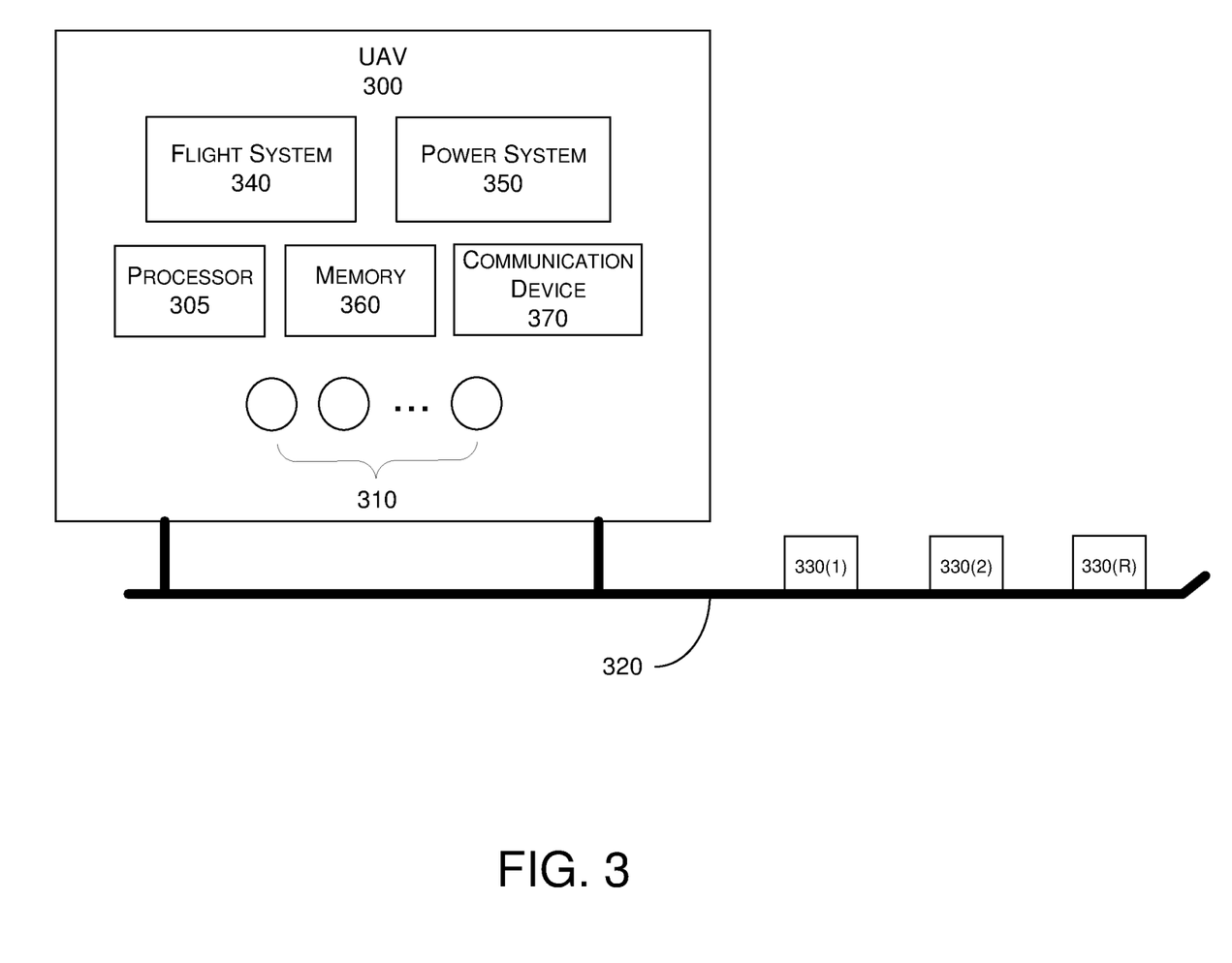
FIG. 3 is a diagram of an example UAV in accordance with an embodiment of the present disclosure.

FIG. 3 illustrates an example UAV 300 in accordance with an embodiment of the present disclosure. The UAV 300 may include a number of components pertinent to the present disclosure as well as a number of components not directly pertinent to the present disclosure. Thus, in the interest of brevity and not obscuring illustration of the pertinent components, FIG. 3 only shows those components pertinent to various embodiments of the present disclosure. Referring to FIG. 3, the UAV 300 may include at least a processor 305, one or more sensors 310, a cradle 320, a number of electromagnets 330(1)~330(R) with R being a positive integer equal to or greater than 1, a flight system 340, a power system 350, a memory 360, and a communication device 370. The one or more sensors 310 may include an IR sensor, a camera, a photodiode array, and/or an image sensor. The one or more sensors 310 may be capable of detecting signals and light emitted from the precision landing beacon 100. The flight system 340 may include electrical, mechanical, and/or hydraulic devices and mechanisms capable of transporting the UAV 300 by flight. The electromagnets 330(1)~330(R) may be installed/mounted on or embedded in the cradle 320. When activated, turned on, or otherwise energized, each of the electromagnets 330(1)~330(R) may be capable of attracting a corresponding magnet (e.g., one of one or more metal components or magnets 130(1)~130(N)) of the precision landing beacon 100 to allow the cradle 320 to hold one or more beacons for deployment and retrieval. The power system 350 may include one or more batteries and may be capable of powering various components of the UAV 300. The memory 360 may be a random-access memory (RAM), read-only memory (ROM), flash memory, or any other type of data storage device that is capable of storing data therein. The communication device 370 may be capable of communicating with one or more external devices wirelessly or via a wired means. For instance, the communication device 370 may be capable of wireless communications in compliance with the Institute of Electrical and Electronics Engineers (IEEE) 802.11 specifications, protocols, and/or standards as well as mobile communications such as Long-Term Evolution (LTE), $5^{th}$ Generation (5G), and New Radio (NR). Moreover, the communication device 370 may have one or more ports (e.g., universal serial bus (USB) ports) for communication with external device(s) in a wired way. The processor 305 may be communicatively coupled to various components of the UAV 300 to control operations thereof.

For instance, the processor 305 may control the flight system 340 to fly UAV 300. The processor 305 may detect, via the one or more sensors 310, light emitted by a beacon (e.g., precision landing beacon 100). The processor 305 may also control the flight system 340 to land the UAV 300 on or near the beacon. The processor 305 may further energize one or more of the electromagnets 330(1)~330(R) on the cradle 320 to retrieve the beacon.

In some embodiments, in controlling the flight system 340 to fly the UAV 300, the processor 305 may obtain the data of a location where the beacon was deployed, define a first area around the location, and control the flight system 340 to fly the UAV 300 to the first area. In some embodiments, in obtaining the data of the location where the beacon was deployed, the processor 305 may either read the data of the location from the memory 360 or receive the data of the location from an external device via the communication device 370.

In some embodiments, in detecting the light emitted by the beacon, the processor 305 may detect a beam of IR light or visible light emitted by the beacon. In some embodiments, the light may include a beam of modulated light that indicates a serial number of the beacon. In some embodiments, the light may carry a code which is one of a plurality of predefined codes recognizable by the processor 305.

In some embodiments, in energizing the one or more electromagnets 330(1)~330(R) on the cradle 320 of the UAV 300 to retrieve the beacon, the processor 305 may energize the one or more electromagnets 330(1)~330(R) to attract one or more metal components or magnets on the beacon (e.g., one or more metal components or the magnets 130(1)~130

(N) on the precision landing beacon 100) to the one or more electromagnets 330(1)~330(R).

In some embodiments, the processor 305 may control the flight system 340 to fly the UAV 300 to a second area. The first area and the second area may be near or apart from each other. The processor 305 may also deenergize the one or more electromagnets 330(1)~330(R) to deploy the beacon or another beacon to the second area. This process may be repeated indefinitely. For example, the processor 305 may control the flight system 340 to fly the UAV 300 to a third area or back to the first area.

Figure 4:
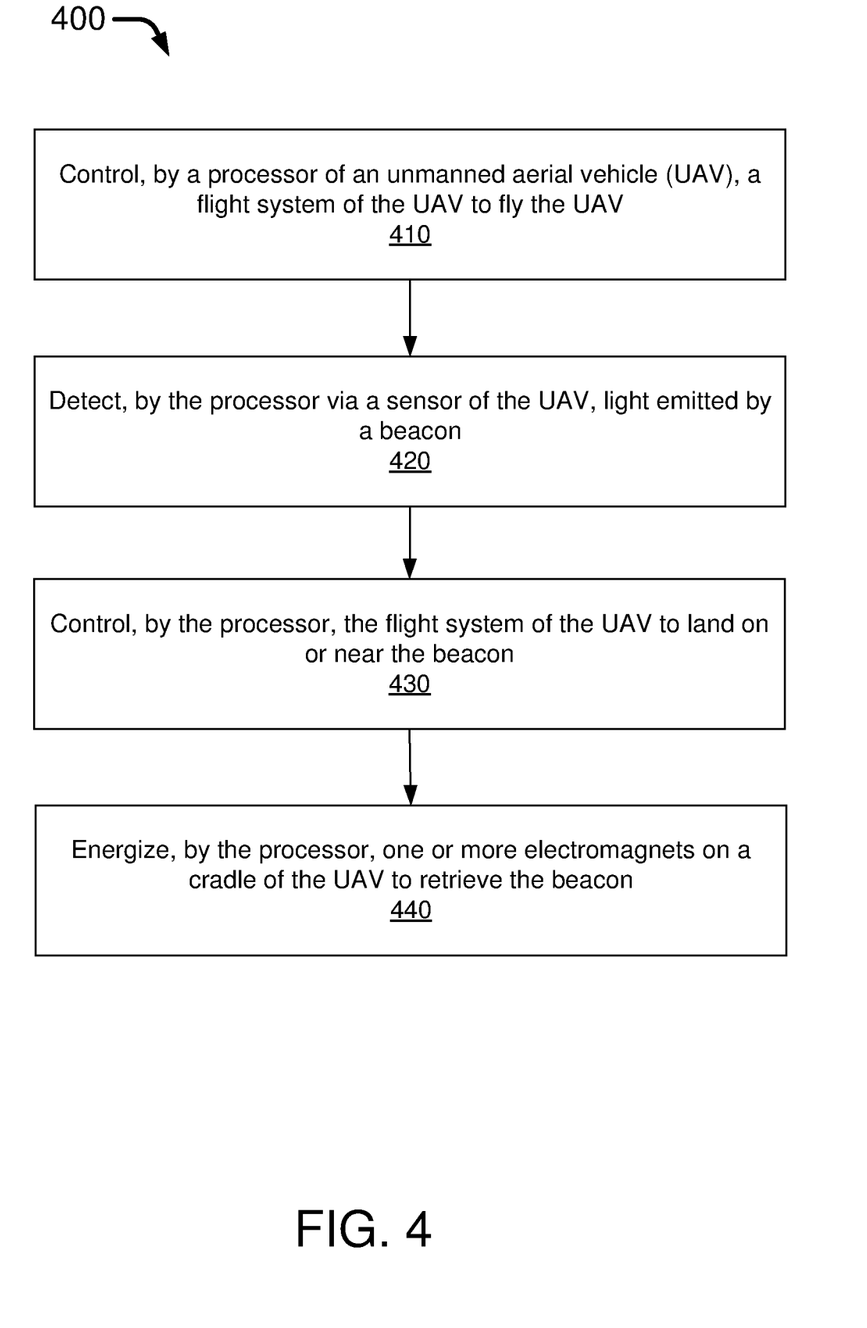
FIG. 4 is a flowchart depicting an example process in accordance with an embodiment of the present disclosure.

FIG. 4 illustrates a flowchart depicting an example process 400 in accordance with an embodiment of the present disclosure. The process 400 may include one or more operations, actions, or functions shown as blocks such as 410, 420, 430, and 440. Although illustrated as discrete blocks, various blocks of the process 400 may be divided into additional blocks, combined into fewer blocks, or eliminated, depending on the desired implementation. For illustrative purposes and without limitation, the following description of the process 400 is provided in the context of the precision landing beacon 100 and the UAV 300. The process 400 may begin at block 410.

At block 410, the process 400 may involve the processor 305 of the UAV 300 controlling the flight system 340 to fly the UAV 300.

At block 420, the process 400 may involve the processor 305 detecting, via the one or more sensors 310 of the UAV 300, light emitted by a beacon (e.g., the precision landing beacon 100).

At block 430, the process 400 may involve the processor 305 controlling the flight system 340 to land the UAV 300 on or near the precision landing beacon 100.

At block 440, the process 400 may involve the processor 305 energizing the one or more electromagnets 330(1)~330 (R) on the cradle 320 of the UAV 300 to retrieve the precision landing beacon 100.

In some embodiments, in controlling the flight system 340 to fly the UAV 300, the process 400 may involve the processor 305 performing a number of operations. For instance, the process 400 may involve the processor 305 obtaining the data of a location where the precision landing beacon 100 was deployed. Additionally, the process 400 may involve the processor 305 defining a first area around the location. Moreover, the process 400 may involve the processor 305 controlling the flight system 340 to fly the UAV 300 to the first area.

In some embodiments, in obtaining the data of the location where the precision landing beacon 100 was deployed, the process 400 may involve the processor 305 either reading the data of the location from the memory 360 of the UAV 300 or receiving the data of the location from an external device via the communication device 370.

In some embodiments, in detecting the light emitted by the precision landing beacon 100, the process 400 may involve the processor 305 detecting a beam of IR light or visible light emitted by the precision landing beacon 100. In some embodiments, the light may include a beam of modulated light that indicates a serial number of the precision landing beacon 100. In some embodiments, the light may carry a code which is one of a plurality of predefined codes recognizable by the processor 305.

In some embodiments, in energizing the one or more electromagnets 330(1)~330(R) to retrieve the precision landing beacon 100, the process 400 may involve the processor 305 energizing the one or more electromagnets 330(1)~330(R) to attract the one or more metal components or magnets 130(1)~130(N) on the precision landing beacon 100 to the one or more electromagnets 330(1)~330(R) on the cradle 320.

In some embodiments, the process 400 may further involve the processor 305 performing additional operations. For instance, the process 400 may involve the processor 305 controlling the flight system 340 to fly the UAV 300 to a second area. Moreover, the process 400 may involve the processor 305 deenergizing the one or more electromagnets 330(1)~330(R) to deploy the precision landing beacon 100 or another beacon to the second area.

In some embodiments, the process 400 may further involve the processor 305 performing other operations. For instance, the process 400 may involve the processor 305 controlling the flight system 340 to fly the UAV 300 to an area. Moreover, the process 400 may involve the processor 305 deploying the beacon (e.g., a first unit of the precision landing beacon 100) or one other beacon (e.g. a second unit of the precision landing beacon 100) carried by the cradle 320 of the UAV 300 to the area.

In some embodiments, in controlling the flight system 340 to fly the UAV 300 to the area, the process 400 may involve the processor 305 obtaining the data of a location where the beacon or the other beacon is to be deployed. Additionally, the process 400 may involve the processor 305 defining the area around the location. Moreover, the process 400 may involve the processor 305 controlling the flight system 340 to fly the UAV 300 to the area. In some embodiments, in obtaining the data of the location, the process 400 may involve the processor 305 either reading the data of the location from the memory 360 of the UAV 300 or receiving the data of the location from an external device (e.g., via the communication device 370).

In some embodiments, in deploying the beacon or the other beacon carried by the cradle 320 of the UAV 300 to the area, the process 400 may involve the processor 305 deenergizing the one or more electromagnets 330(1)~330(R) on the cradle 320 to deploy the beacon or the other beacon to the area. In such cases, each of the beacon and the other beacon may include one or more metal components or magnets (e.g., the one or more metal components or magnets 130(1)~130(N)) attracted to the cradle 320 of UAV 300 when the one or more electromagnets 330(1)~330(R) are energized.

Figure 5:
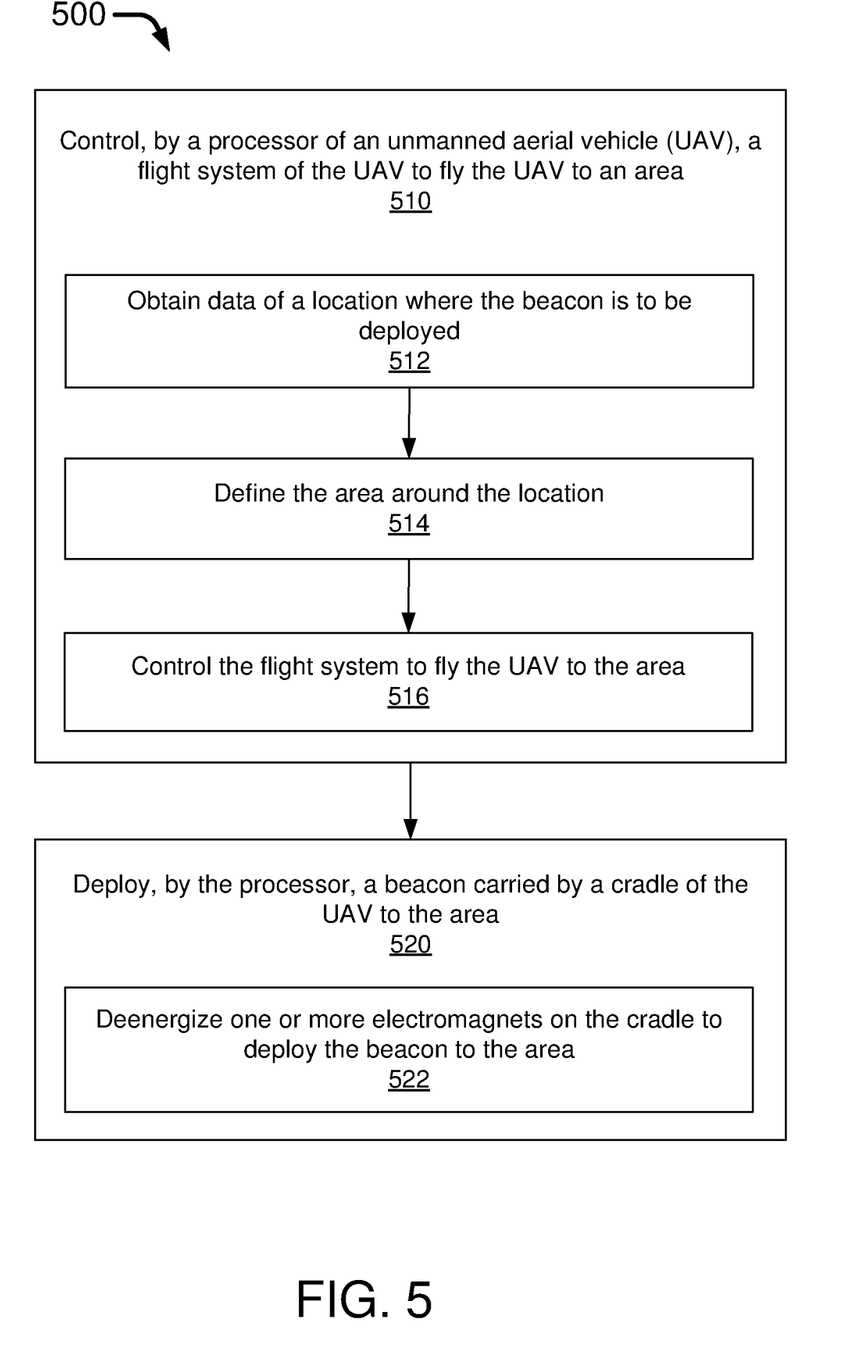
FIG. 5 is a flowchart depicting an example process in accordance with an embodiment of the present disclosure.

FIG. 5 illustrates a flowchart depicting an example process 500 in accordance with an embodiment of the present disclosure. The process 500 may include one or more operations, actions, or functions shown as blocks such as 510-522 of FIG. 5. Although illustrated as discrete blocks, various blocks of the process 500 may be divided into additional blocks, combined into fewer blocks, or eliminated, depending on the desired implementation. For illustrative purposes and without limitation, the following description of the process 500 is provided in the context of the precision landing beacon 100 and the UAV 300. The process 500 may begin at block 510.

At block 510, the process 500 may involve the processor 305 controlling the flight system 340 to fly the UAV 300 to an area. The process 500 may proceed from block 510 to block 520.

At block 520, the process 500 may involve the processor 305 deploying a beacon (e.g., the precision landing beacon 100) carried by the cradle 320 of the UAV 300 to the area.

In some embodiments, in controlling the flight system 340 to fly the UAV 300 to the area, the process 500 may involve the processor 305 performing a number of operations, as represented by blocks 512, 514 and 516.

At block 512, the process 500 may involve the processor 305 obtaining the data of a location where the precision landing beacon 100 is to be deployed.

At block 514, the process 500 may involve the processor 305 defining the area around the location.

At block 516, the process 500 may involve the processor 305 controlling the flight system 340 to fly the UAV 300 to the area.

In some embodiments, in obtaining the data of the location, the process 500 may involve the processor 305 either reading the data of the location from the memory 360 of the UAV 300 or receiving the data of the location from an external device via the communication device 370.

In some embodiments, in deploying the precision landing beacon 100 carried by the cradle 320 of the UAV 300 to the area, the process 500 may involve the processor 305 performing a number of operations, as represented by block 522.

At block 522, the process 500 may involve the processor 305 deenergizing the one or more electromagnets 330(1)~330(R) on the cradle 320 to deploy the precision landing beacon 100 to the area. The precision landing beacon 100 may include the one or more metal components or magnets 130(1)~130(N) attracted to the cradle 320 of the UAV 300 when the one or more electromagnets 330(1)~330(R) are energized.

EXAMPLES

In some instances, the following examples may be implemented together or separately by the systems and methods described herein.

Example 1 may include a method, comprising: receiving, by a processor of an unmanned aerial vehicle (UAV), a signal from a beacon; directing, by the processor, a flight system of the UAV to land the UAV on or near the beacon; and directing, by the processor, one or more electromagnets on a cradle of the UAV to energize to retrieve the beacon.

Example 2 may include the method of example 1 and/or some other example herein, further comprising: receiving, by the processor, data of a first location where the beacon was deployed; determining, by the processor, a first area including the first location; and directing, by the processor, the flight system to fly the UAV to the first area.

Example 3 may include the method of example 2 and/or some other example herein, wherein receiving the data of the first location where the beacon was deployed comprises: reading, by the processor, the data of the first location from a memory of the UAV; or receiving, by the processor, the data of the first location from an external device.

Example 4 may include the method of example 1 and/or some other example herein, wherein receiving the signal from the beacon comprises receiving, by a sensor of the UAV, a beam of infrared (IR) light or visible light emitted by the beacon.

Example 5 may include the method of example 1 and/or some other example herein, wherein the signal comprises a beam of modulated light that indicates a serial number of the beacon.

Example 6 may include the method of example 1 and/or some other example herein, wherein the signal includes a code recognizable by the processor of the UAV.

Example 7 may include the method of example 1 and/or some other example herein, wherein energizing the one or more electromagnets on the cradle of the UAV to retrieve the beacon comprises energizing the one or more electromagnets on the cradle of the UAV to attract one or more metal components or magnets on the beacon to the one or more electromagnets on the cradle.

Example 8 may include the method of example 1 and/or some other example herein, further comprising: directing, by the processor, the flight system of the UAV to fly the UAV to a second area; and directing, by the processor, the deenergizing the one or more electromagnets on the cradle of the UAV to deploy the beacon to the second area.

Example 9 may include the method of example 1 and/or some other example herein, further comprising: directing, by the processor, the flight system to fly the UAV to an area; and directing, by the processor, the deployment of the beacon carried by the cradle of the UAV to the area.

Example 10 may include the method of example 9 and/or some other example herein, wherein controlling the flight system of the UAV to fly the UAV to the area comprises: receiving, by the processor, data of a location where the beacon is to be deployed; determining, by the processor, the area including the location; and directing, by the processor, the flight system to fly the UAV to the area.

Example 11 may include the method of example 10 and/or some other example herein, wherein receiving the data of the location comprises: reading, by the processor, the data of the location from a memory of the UAV; or receiving, by the processor, the data of the location from an external device.

Example 12 may include the method of example 9 and/or some other example herein, wherein deploying the beacon carried by the cradle of the UAV to the area comprises deenergizing one or more electromagnets on the cradle to deploy the beacon, and wherein the beacon comprises one or more metal components or magnets attracted to the cradle of the UAV when the one or more electromagnets are energized.

Example 13 may include a system, comprising: a beacon deployable by an unmanned aerial vehicle (UAV), the beacon comprising: a light source array capable of emitting a beam of light; a power circuit capable of powering the light source array; one or more metal components or magnets used by the UAV to retrieve and deploy the beacon; and a parachute capable of creating a drag or an aerodynamic lift to slow a downward fall of the beacon due to gravity when the beacon is deployed by the UAV.

Example 14 may include the system of example 13 and/or some other example herein, wherein the light source array emits a beam of infrared (IR) light, visible light, or both IR light and visible light.

Example 15 may include the system of example 13 and/or some other example herein, wherein the beam of light comprises a beam of modulated light that indicates a serial number of the beacon.

Example 16 may include the system of example 13 and/or some other example herein, wherein the beam of light carries a code recognizable by a processor of the UAV.

Example 17 may include the system of example 13 and/or some other example herein, wherein the beacon further comprises: a buzzer, a light-emitting diode (LED), or both; and a button operable by a user to activate the buzzer, the LED, or both.

Example 18 may include the system of example 13 and/or some other example herein, wherein the beacon further comprises: one or more switches settable by a user to a respective value, wherein a configuration of the one or more switches corresponds to one of a plurality of predefined codes, and wherein the beam of light is modulated to indicate one of the plurality of predefined codes.

Example 19 may include the system of example 13 and/or some other example herein, further comprising: the UAV, the UAV comprising: a flight system configured to fly the UAV; a sensor capable of detecting the beam of light emitted by the light source array of the beacon; a cradle capable of carrying the beacon; and a processor that controls operations of the flight system, the sensor, and the cradle.

Example 20 may include a method, comprising: directing, by a processor of an unmanned aerial vehicle (UAV), a flight system of the UAV to fly the UAV; directing, by the processor, deployment of a beacon carried by the UAV; receiving, by the processor via a sensor of the UAV, a signal emitted by the beacon; and directing, by the processor, the flight system to land the UAV on or near the beacon.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

What is claimed is:

1. A method, comprising:
receiving, by a processor of an unmanned aerial vehicle (UAV), a beam of light from a beacon, wherein the beacon comprises one or more switches settable by a user to a respective value, wherein a configuration of the one or more switches corresponds to one of a plurality of predefined codes, wherein the beam of light is modulated to indicate one of the plurality of predefined codes;
directing, by the processor, a flight system of the UAV to land the UAV on or near the beacon;
directing, by the processor, one or more electromagnets on a cradle of the UAV to energize to retrieve the beacon; and
directing, by the processor, the flight system of the UAV to fly the UAV attaching the beacon to an area.

2. The method of claim 1, wherein directing the flight system of the UAV to land the UAV on or near the beacon further comprises:
receiving, by the processor, data of a first location where the beacon was deployed;
determining, by the processor, a first area including the first location; and
directing, by the processor, the flight system to fly the UAV to the first area.

3. The method of claim 2, wherein receiving the data of the first location where the beacon was deployed comprises:
reading, by the processor, the data of the first location from a memory of the UAV; or
receiving, by the processor, the data of the first location from an external device.

4. The method of claim 1, wherein receiving the beam of light from the beacon comprises receiving, by a sensor of the UAV, a beam of infrared (IR) light or visible light emitted by the beacon.

5. The method of claim 1, wherein the beam of light comprises a beam of modulated light that indicates a serial number of the beacon.

6. The method of claim 1, wherein the beam of light includes a code recognizable by the processor of the UAV.

7. The method of claim 1, wherein energizing the one or more electromagnets on the cradle of the UAV to retrieve the beacon comprises energizing the one or more electromagnets on the cradle of the UAV to attract one or more metal components or magnets on the beacon to the one or more electromagnets on the cradle.

8. The method of claim 1, further comprising:
directing, by the processor, the deenergizing the one or more electromagnets on the cradle of the UAV to deploy the beacon to the area.

9. The method of claim 1, wherein the area is a first area, and the beacon is a first beacon, the method further comprises:
directing, by the processor, the flight system to fly the UAV attaching a second beacon to a second area; and
directing, by the processor, a deployment of the second beacon carried by the cradle of the UAV to the second area.

10. The method of claim 9, wherein directing the flight system of the UAV to fly the UAV to the second area comprises:
receiving, by the processor, data of a location where the second beacon is to be deployed;
determining, by the processor, the second area including the location; and
directing, by the processor, the flight system to fly the UAV to the second area.

11. The method of claim 10, wherein receiving the data of the location comprises:
reading, by the processor, the data of the location from a memory of the UAV; or
receiving, by the processor, the data of the location from an external device.

12. The method of claim 9, wherein deploying the second beacon carried by the cradle of the UAV to the second area comprises deenergizing the one or more electromagnets on the cradle to deploy the second beacon, and wherein the second beacon comprises one or more metal components or magnets attracted to the cradle of the UAV when the one or more electromagnets are energized.

13. A system, comprising:
a beacon deployable by an unmanned aerial vehicle (UAV), the beacon comprising:
a light source array capable of emitting a beam of light;
a power circuit capable of powering the light source array;
one or more metal components or magnets used by the UAV to retrieve and deploy the beacon;
a parachute capable of creating a drag or an aerodynamic lift to slow a downward fall of the beacon due to gravity when the beacon is deployed by the UAV; and
one or more switches settable by a user to a respective value;
wherein a configuration of the one or more switches corresponds to one of a plurality of predefined codes, and
wherein the beam of light is modulated to indicate one of the plurality of predefined codes.

14. The system of claim 13, wherein the light source array emits a beam of infrared (IR) light, visible light, or both IR light and visible light.

15. The system of claim 13, wherein the beam of light comprises a beam of modulated light that indicates a serial number of the beacon.

16. The system of claim 13, wherein the beam of light carries a code recognizable by a processor of the UAV.

17. The system of claim 13, wherein the beacon further comprises:
a buzzer, a light-emitting diode (LED), or both; and
a button operable by the user to activate the buzzer, the LED, or both.

18. The system of claim 13, further comprising:
the UAV, the UAV comprising:
- a flight system configured to fly the UAV;
- a sensor capable of detecting the beam of light emitted by the light source array of the beacon;
- a cradle capable of carrying the beacon; and
- a processor that controls operations of the flight system, the sensor, and the cradle.

19. A method, comprising:
- directing, by a processor of an unmanned aerial vehicle (UAV), a flight system of the UAV to fly the UAV to a first area;
- directing, by the processor, deployment of a beacon carried by the UAV to the first area wherein the beacon comprises one or more switches settable by a user to a respective value, wherein a configuration of the one or more switches corresponds to one of a plurality of predefined codes, wherein a beam of light emitted by the beacon is modulated to indicate one of the plurality of predefined codes;
- receiving, by the processor via a sensor of the UAV, a signal the modulated beam of light emitted by the beacon;
- directing, by the processor, the flight system to land the UAV on or near the beacon;
- directing, by the processor, one or more electromagnets on a cradle of the UAV to energize to retrieve the beacon; and
- directing, by the processor, the flight system of the UAV to fly the UAV attaching the beacon to a second area.

* * * * *